(12) United States Patent
Willis et al.

(10) Patent No.: US 9,797,243 B2
(45) Date of Patent: Oct. 24, 2017

(54) GEOPHYSICAL PROSPECTING BY PROCESSING VERTICAL SEISMIC PROFILES USING DOWNWARD CONTINUATION

(71) Applicant: Halliburton Energy Services, Inc., Houston, TX (US)

(72) Inventors: Mark Elliott Willis, Katy, TX (US); Yue Du, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 61 days.

(21) Appl. No.: 14/432,247

(22) PCT Filed: Aug. 13, 2014

(86) PCT No.: PCT/US2014/050848
§ 371 (c)(1),
(2) Date: Mar. 30, 2015

(87) PCT Pub. No.: WO2015/026594
PCT Pub. Date: Feb. 26, 2015

(65) Prior Publication Data
US 2015/0260036 A1   Sep. 17, 2015

Related U.S. Application Data

(60) Provisional application No. 61/868,656, filed on Aug. 22, 2013.

(51) Int. Cl.
*G01V 1/50* (2006.01)
*E21B 49/00* (2006.01)
(Continued)

(52) U.S. Cl.
CPC ............... *E21B 49/00* (2013.01); *E21B 7/00* (2013.01); *G01V 1/42* (2013.01); *G01V 1/50* (2013.01);
(Continued)

(58) Field of Classification Search
CPC .. E21B 7/00; E21B 49/00; G01V 1/42; G01V 1/50; G01V 2210/52; G01V 2210/57; G01V 2210/125; G01V 2210/161; G01V 2210/53
(Continued)

(56) References Cited

U.S. PATENT DOCUMENTS 4,464,737 A * 8/1984 Pann ...................... G01V 1/301
367/49
4,648,080 A * 3/1987 Hargreaves ............ G01V 13/00
181/110
(Continued)

FOREIGN PATENT DOCUMENTS

SA   WO 2005071222 A1 * 8/2005 ............. E21B 49/00

OTHER PUBLICATIONS

Berryhill, John R., Submarine Canyons: Velocity Replacement by Wave-Equation Datuming Before Stack, Geophysics, vol. 51, No. 8, Aug. 1986, pp. 1572-1579.
(Continued)

*Primary Examiner* — Daniel L Murphy
(74) *Attorney, Agent, or Firm* — McDermott Will & Emery LLP

(57) ABSTRACT

Geophysical prospecting may be achieved using borehole seismic data and processing velocity seismic profiles using downward continuation to simulate the seismic source being at the depth of the borehole receivers. Such methods may involve collecting seismic data for a subterranean formation with at least one borehole receiver; grouping the seismic data into a one common receiver gather corresponding to each borehole receiver; performing a downward continuation on at least one of the common receiver gathers to produce corresponding downward continued common receiver gathers; performing a normal moveout analysis on
(Continued)

at least one of the downward continued common receiver gathers to produce corresponding semblance velocity spectra; and analyzing at least one of the semblance velocity spectra for a zone of interest in the subterranean formation.

20 Claims, 9 Drawing Sheets

(51) Int. Cl.
  *E21B 7/00* (2006.01)
  *G01V 1/42* (2006.01)
(52) U.S. Cl.
  CPC .. *G01V 2210/125* (2013.01); *G01V 2210/161* (2013.01); *G01V 2210/52* (2013.01); *G01V 2210/53* (2013.01); *G01V 2210/57* (2013.01)
(58) Field of Classification Search
  USPC .................................. 367/52; 175/50; 702/6
  See application file for complete search history.

(56) References Cited

U.S. PATENT DOCUMENTS

| | | | |
|---|---|---|---|
| 4,794,573 A | 12/1988 | Bell et al. | |
| 4,841,444 A * | 6/1989 | Chittineni | G01V 1/34 367/38 |
| 4,887,244 A * | 12/1989 | Willis | G01V 1/28 367/40 |
| 5,148,407 A | 9/1992 | Haldorsen et al. | |
| 6,289,285 B1 * | 9/2001 | Neff | G01V 1/303 702/16 |
| 6,442,490 B1 | 8/2002 | Li et al. | |
| 7,093,672 B2 * | 8/2006 | Seydoux | E21B 7/04 175/24 |
| 2003/0076740 A1 | 4/2003 | Calvert | |
| 2005/0174886 A1 | 8/2005 | Fuller et al. | |
| 2008/0133140 A1 | 6/2008 | Ferber et al. | |
| 2009/0097356 A1 | 4/2009 | Haldorsen et al. | |
| 2010/0118653 A1 | 5/2010 | He et al. | |

OTHER PUBLICATIONS

Ferber et al., Normal Movement Velocity Analysis of Seismic Reflection Interferograms, In: 71st EAGE Conference and Exhibition, 2009, U025, pp. 1-5.

International Search Report and Written Opinion for PCT/US2014/050848 dated Nov. 24, 2014.

Kurang et al., "Comparing Virtual Versus Real Crosswell Surveys," SEG Las Vegas 2008 Annual Meeting, pp. 1372-1376.

Extended European Search Report from European Application No. 14837850.8, dated Feb. 9, 2017.

\* cited by examiner

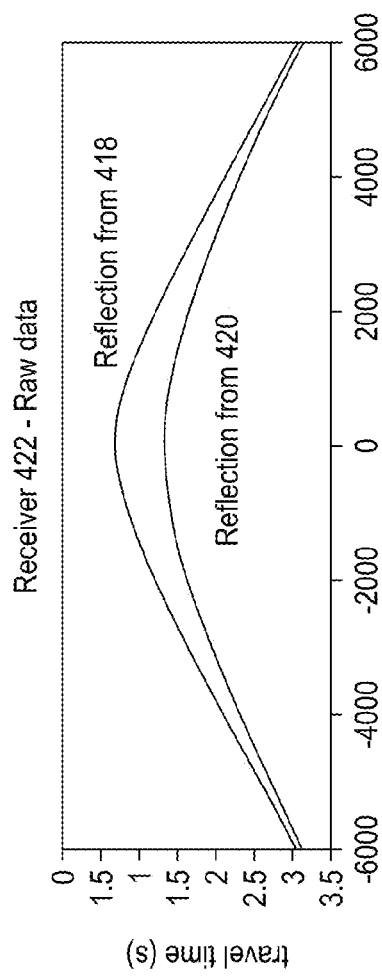
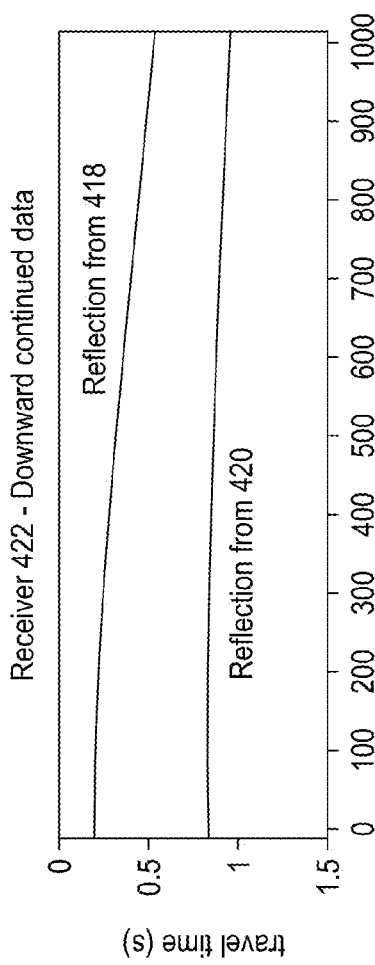
FIG. 5A
FIG. 5B

GEOPHYSICAL PROSPECTING BY PROCESSING VERTICAL SEISMIC PROFILES USING DOWNWARD CONTINUATION

BACKGROUND

The exemplary embodiments described herein relate to geophysical prospecting using borehole seismic data and processing velocity seismic profiles using downward continuation to simulate the seismic source being at the depth of the borehole receivers.

Surface seismic exploration uses energy from a seismic source that reflects from subsurface geophysical features to multiple receivers to interrogate the composition of a subterranean formation. Historically, the receivers were placed at the surface. However, more recently borehole seismology has been employed where the receivers are placed in boreholes. The data collected from the receivers along the borehole is known as a vertical seismic profile ("VSP"). VSP methods advantageously allow for increased seismic frequency content, which provides greater detail of the geophysical features.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 5A illustrates the raw seismic data for the first common receiver gather of FIG. 4.

FIG. 5B illustrates the downward continued data from FIG. 5A.

DETAILED DESCRIPTION

The exemplary embodiments described herein relate to geophysical prospecting using borehole seismic data and processing velocity seismic profiles using downward continuation to simulate the seismic source being at the depth of the borehole receivers.

Figure 1:
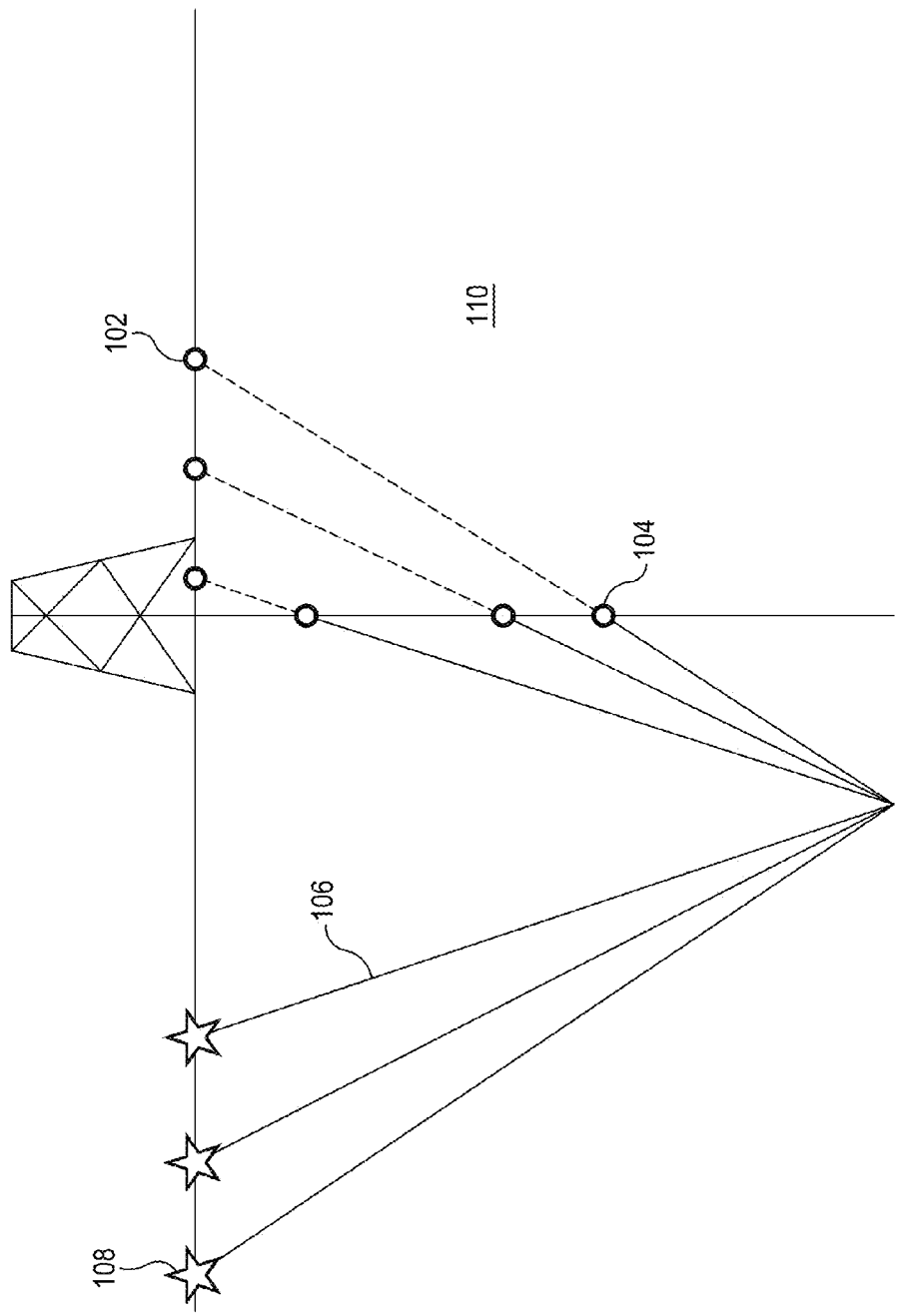
FIG. 1 illustrates the location seismic sources, seismic surface receivers, and borehole receivers.

FIG. 1 provides an illustration comparing the location of various seismic surface receivers 102 and borehole receivers 104. The energy 106 from one or more seismic sources 108 at or near the surface travels through the subterranean formation 110, reflects off of various subterranean formations or geological features, and is subsequently collected as seismic data at the surface using the surface receivers 102 or within the borehole using the borehole receivers 104. When using surface receivers 102, the path the energy 106 travels through the formation is generally symmetric. In contrast, when using borehole receivers 104, the path the energy 106 travels through the formation is asymmetric. Because of the asymmetry associated with using borehole receivers 104 in VSP methods, conventional surface seismic velocity analysis methods that analyze the seismic data cannot be used.

Figure 2:
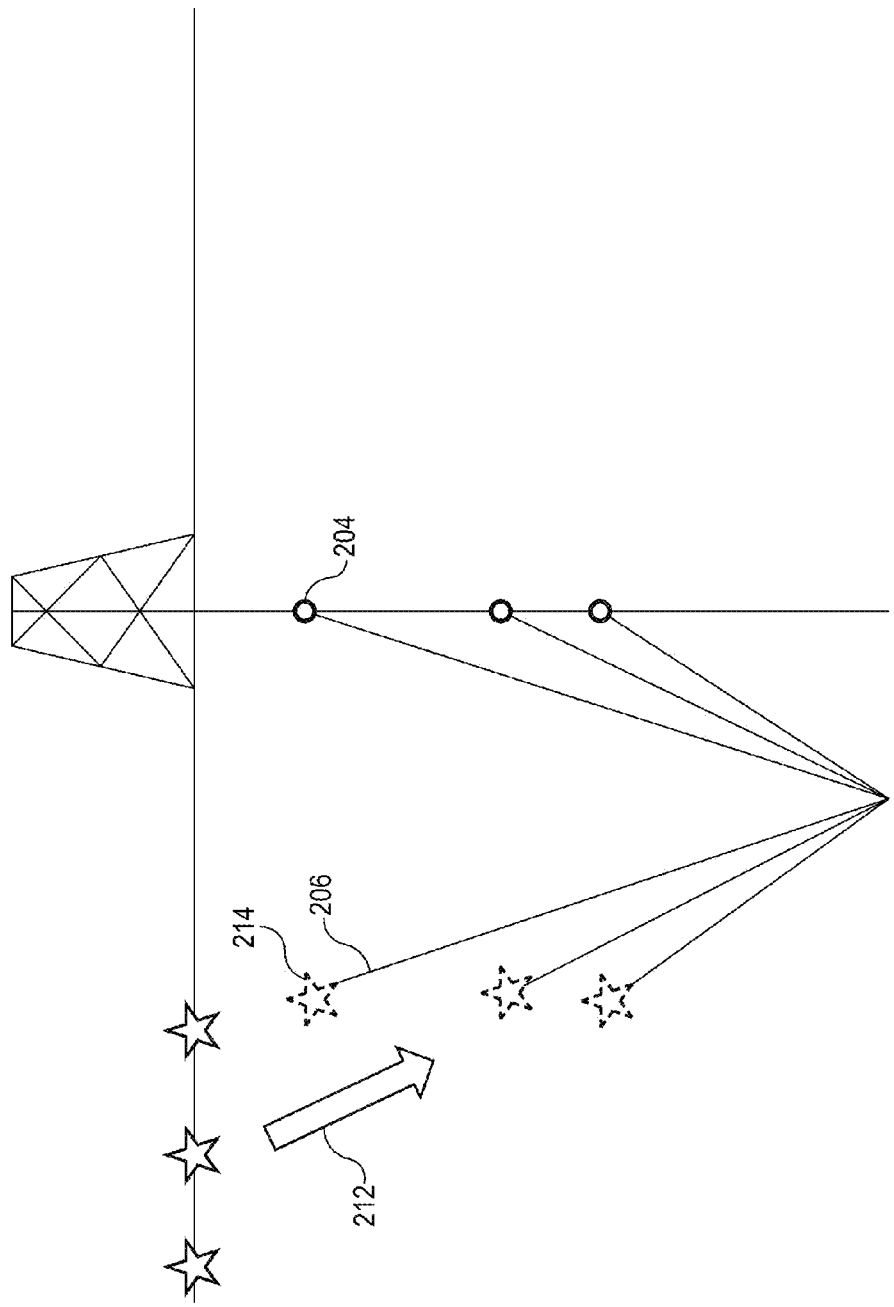
FIG. 2 illustrates shifted seismic data corresponding to simulated seismic sources at the depth of the borehole receivers.

As illustrated in FIG. 2, the exemplary embodiments described herein use downward continuation 212 to mathematically calculate shifted seismic data corresponding to simulated seismic sources 214 at the depth of the borehole receivers 204. The downward continuation 212 returns symmetry to the profile of the energy 206 and allows for the use of conventional surface seismic velocity analysis methods to analyze the shifted seismic data. As used herein, the term "downward continuation" refers to a series of mathematical manipulations that apply time shifts to the data so the traces appear to be generated and recorded, respectively, by sources and receivers relocated to other places. In some instances, the downward continuation may be achieved by applying either Kirchhoff or wave-equation based extrapolation operators to the data.

Figure 3:
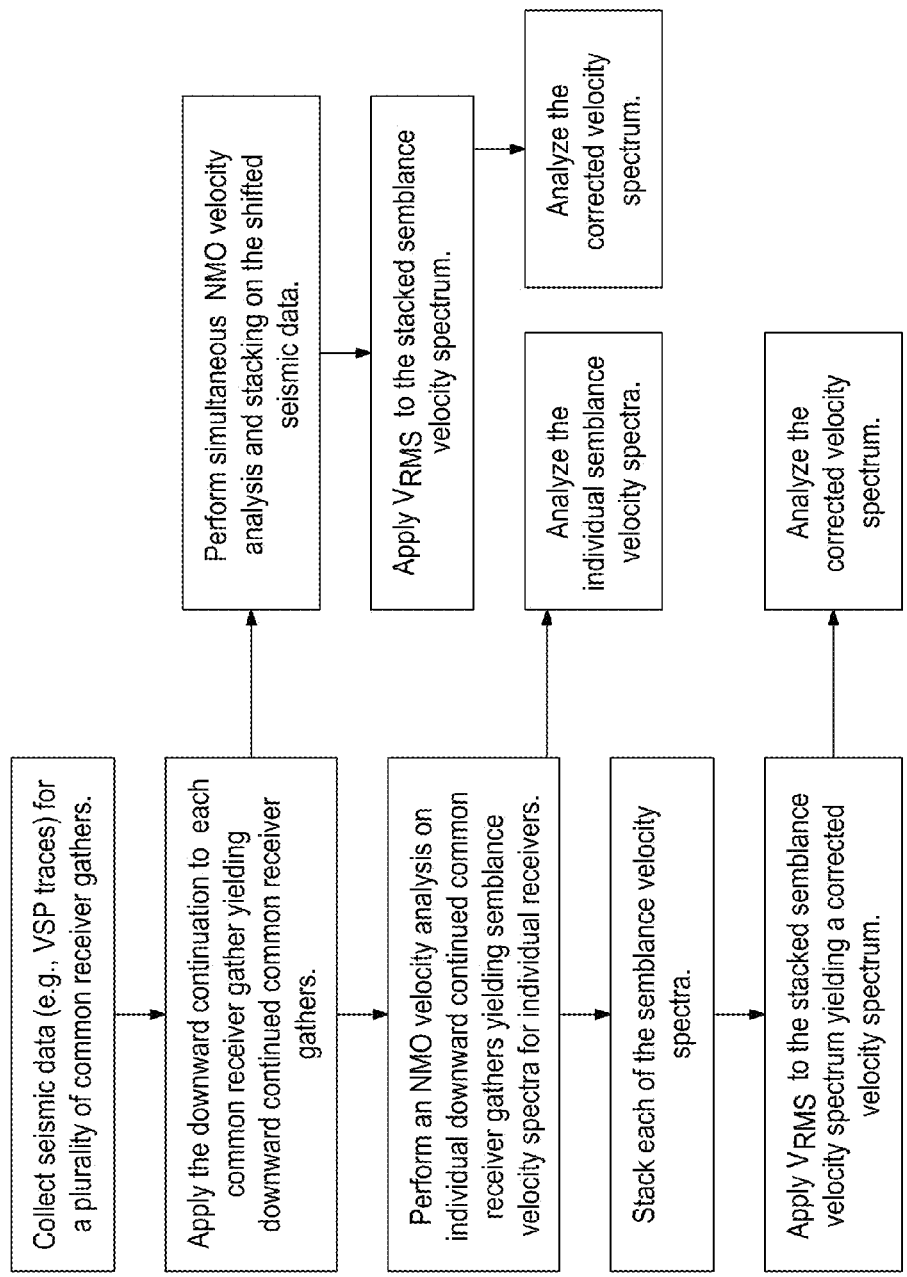
FIG. 3 provides a flow diagram of methods according to at least some embodiments described herein.

FIG. 3 provides a flow diagram of one or more methods according to at least some embodiments described herein. As illustrated, the methods enable processing of VSP using downward continuation to simulate energy from a seismic source at the depth of the borehole receivers. One or more seismic sources project energy into the subterranean formation and the seismic data is collected by one or more borehole receivers. The seismic data collected at a single receiver from multiple seismic sources is referred to herein as a "common receiver gather." A downward continuation is applied to each common receiver gather, which yields downward continued common receiver gathers as if the seismic source were at the depth of the corresponding borehole receiver.

Several downward continuation methodologies may be utilized in the methods described herein. For example, a finite difference modeling code that back propagates the data downward to the depth of the borehole receiver may be achieved by time reversing the traces (or path the energy from the seismic source travels) in a borehole receiver and 'injecting' the traces as seismic sources on the surface in the modeling code. As the modeling progresses, the new traces are collected at a set of fictitious locations all along the x (and y) direction(s) of the model at the depth of the borehole receiver.

In another example, a Berryhill-style of downward continuation by a wave equation extrapolation can be performed on the seismic data (or VSP) from each borehole receiver to simulate the seismic source being at the depth of the borehole receiver.

In yet another example, a Huygen's-style downward continuation by a Kirchhoff-like extrapolation can be performed on the seismic data from each borehole receiver to simulate the seismic source being at the depth of the borehole receiver.

Still referring to FIG. 3, after downward continuation, a normal moveout ("NMO") analysis can then be applied to each downward continued common receiver gather to correct the reflection times and yield velocity spectra. An example of a suitable NMO analysis is provided in Equation 1 below where t is time, $V_{RMS}$ is the root mean square ("RMS") velocity of the layers, b is the half-offset of the seismic source from the borehole receiver, and z is the depth from the borehole receiver (or the shifted seismic source) to the reflector (i.e., the point of reflection within the subterranean formation). Further, an example equation for $V_{RMS}$ is provided in Equation 2 below where $V_k$ is the interval velocity of the $k^{th}$ layer and $\Delta \tau_k$ is the vertical travel time in the $k^{th}$ layer.

$$t = \sqrt{\frac{4b^2 + 4z^2}{V_{RMS}^2}} = \sqrt{t_0^2 + \frac{4b^2}{V_{RMS}^2}} \quad \text{Equation 1}$$

$$V_{RMS} = \sqrt{\frac{\sum_{k=1}^{N} \Delta \tau_k V_k^2}{\sum_{K=1}^{N} \Delta \tau_k}} \quad \text{Equation 2}$$

Then, the semblance velocity spectra for each borehole receiver 204 (FIG. 2) may be stacked. Because each borehole receiver 204 (FIG. 2) is at different depths, a $V_{RMS}$ correction may be applied to correct the velocity spectra of the shallower receivers to be as if they were collected at the depth of the deeper receivers. The $V_{RMS}$ correction will remap the shifted data to a different time and velocity in order to align all of the semblance velocity spectra for each downward shifted common receiver gather to be consistent with each other, thereby yielding a corrected velocity spectrum of the subterranean formation or a portion thereof (e.g., the subterranean formation proximal to a single reflection point). One of ordinary skill in the art should recognize that the semblance velocity spectra that are stacked and $V_{RMS}$ corrected would be at the depth of the reflection point of interest or shallower.

The $V_{RMS}$ correction may be performed using, for example, Equations 3 and 4 below where t is time, "bot" refers to the lower, or bottom receiver, "top" refers to a shallower receiver, $\Delta z$ is the depth difference between the receivers, and $V_{RMS}$ is the RMS velocity of the interval between the receivers.

$$t_{bot} = t_{top} - \frac{2\Delta z}{V_{RMS}} \quad \text{Equation 3}$$

$$V_{bot} = \sqrt{\frac{V_{top}^2 \frac{t_{top}}{2} - V_{RMS} \Delta z}{\frac{t_{top}}{2} - \frac{\Delta z}{V_{RMS}}}} \quad \text{Equation 4}$$

Still referring to FIG. 3, alternatively, in some instances, the NMO analysis and stacking can be performed simultaneously on all of the downward continued common receiver gathers to yield a semblance velocity spectra of the subterranean formation, which can then be $V_{RMS}$ corrected to yield a corrected velocity spectrum of the subterranean formation or a portion thereof (e.g., the subterranean formation proximal to a single reflection point).

The semblance velocity spectrum (spectra), the corrected velocity spectrum, or both of the subterranean formations or a portion(s) thereof can then be used to identify zones of interest for subterranean treatments (e.g., drilling, stimulating, isolating, producing, or combinations thereof).

Identifying a zone of interest may involve identifying one or more points on the semblance velocity spectrum (spectra), the corrected velocity spectrum, or both that may then be converted to a series of interval velocities ($V_{int}$) as a function of time representing the subsurface using, for example, the Dix Equation (Equation 5 below where t is time). Generally, the Dix Equation applies to flat layers, which may be corrected for inclination with a correction function known in the art.

$$V_{int_{t_n}}^2 = \frac{V_{RMS_n}^2 t_n - V_{RMS_{n-1}}^2 t_{n-1}}{t_n - t_{n-1}} \quad \text{Equation 5}$$

The series of interval velocities as a function of time may then be converted to a series of interval velocities as a function of depth using a time to depth scaling. The zone of interest may then be identified based on the interval velocities as a function of depth. The zone of interest in some instances may include hydrocarbons (e.g., oil and natural gas), which may be drilled and produced. In some instances, the zone of interest may include water, over-pressured gas, or other compositions that may be avoided during drilling and production operations. In some instances where more than one zone of interest is identified, a combination of the foregoing may be performed.

The exemplary methods described herein allow for a straightforward analysis of a complex formation by uniquely combining the downward continuation described herein and the stacking or assembling of the velocity spectra to remove and simplify the overlying structures in the analysis.

Embodiments disclosed herein include:

A: a method that includes collecting seismic data for a subterranean formation with at least one borehole receiver; grouping the seismic data into a one common receiver gather corresponding to each borehole receiver; performing a downward continuation on at least one of the common receiver gathers to produce corresponding downward continued common receiver gathers; performing a normal moveout analysis on at least one of the downward continued common receiver gathers to produce corresponding semblance velocity spectra; and analyzing at least one of the semblance velocity spectra for a zone of interest in the subterranean formation;

B: a method that includes collecting seismic data for a subterranean formation with at least one borehole receiver; grouping the seismic data into a plurality of common receiver gathers; performing a downward continuation on each of the common receiver gathers to produce corresponding downward continued common receiver gathers; performing a normal moveout analysis on at least one of the downward continued common receiver gathers, thereby yielding a plurality of semblance velocity spectra; stacking the plurality of semblance velocity spectra, thereby yielding a stacked semblance velocity spectrum; performing a root mean square velocity correction on the stacked semblance velocity spectrum, thereby yielding a corrected velocity spectrum; and analyzing the corrected velocity spectrum for a zone of interest in the subterranean formation;

C: a method that includes collecting seismic data for a subterranean formation with at least one borehole receiver; grouping the seismic data into a plurality of common receiver gathers; performing a downward continuation on each of the common receiver gathers to produce corresponding downward continued common receiver gathers; performing a normal moveout analysis on at least one of the downward continued common receiver gathers, thereby yielding a plurality of semblance velocity spectra; performing a root mean square velocity correction on at least one of the semblance velocity spectrum, thereby yielding a corrected velocity spectrum; and analyzing the corrected velocity spectrum for a zone of interest in the subterranean formation; and D: a method that includes collecting seismic data for a subterranean formation with a plurality of borehole receivers; grouping the seismic data into a plurality of common receiver gathers; performing a downward continuation on each of the common receiver gathers to produce corresponding downward continued common receiver gathers; simultaneously performing a normal moveout analysis, performing a root mean square velocity correction, and stacking the downward continued common receiver gathers, thereby yielding a corrected velocity spectrum; and analyzing the corrected velocity spectrum for a zone of interest in the subterranean formation.

Each of embodiments A, B, and C may have one or more of the following additional elements in any combination: Element 1: wherein the downward continuation is a finite difference modeling code with back propagation; Element 2: wherein the downward continuation is a Berryhill style of downward continuation by a wave equation extrapolation; Element 3: wherein the downward continuation is a Huygen's style downward continuation by a Kirchhoff-like extrapolation; Element 4: wherein analyzing the at least one semblance velocity spectra for Embodiment A or the corrected velocity spectrum for Embodiments B-D involves (1) identifying one or more velocities of interest, (2) converting the identified velocities to a series of interval velocities as a function of time, and (3) converting the series of interval velocities as a function of time to a series of interval velocities as a function of depth; Element 5: Element 4 wherein converting the identified velocities utilizes the Dix Equation; Element 6: the method further including drilling into and producing a fluid from the zone of interest; Element 7: the method of further including drilling into the subterranean formation while avoiding the zone of interest; and Element 8: wherein more than one zone of interest is identified and the method further includes Element 6 or Element 7 relative to each zone of interest.

By way of nonlimiting examples combinations of the foregoing elements that may be applied to Embodiments A-D may include: Element 4 and optionally Element 5 in combination with one of Elements 1-3; Element 4 and optionally Element 5 in combination with one of Elements 6-8 an optionally in further combination with one of Elements 1-3; and one of Elements 1-3 in combination with one of Elements 6-8.

In alternate embodiments, the VSPs may be reverse VSPs where the seismic sources are in the borehole and the receivers are at the surface. Accordingly, the embodiments described herein would apply to common seismic source gathers (also referred to as common shot gathers) and downward continuing the receivers to be at the level of the borehole seismic sources.

To facilitate a better understanding of the present invention, the following examples of preferred or representative embodiments are given. In no way should the following examples be read to limit, or to define, the scope of the invention.

EXAMPLES

Figure 4:
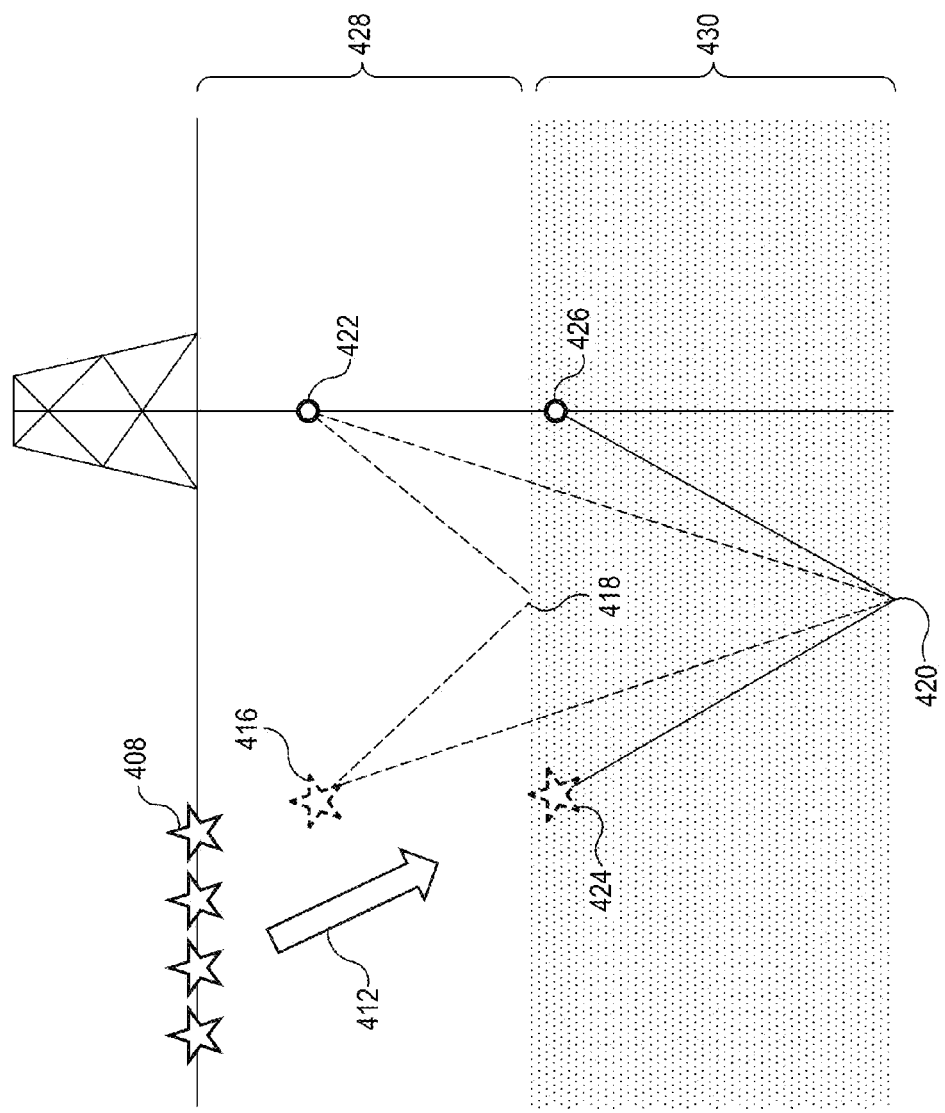
FIG. 4 illustrates a geometry of a portion of two downward continued common receiver gathers.

Synthetic seismic data from a plurality of synthetic seismic sources and synthetic borehole receivers for a subterranean formation containing a lithology change was first grouped to form common receiver gathers. Downward continuation was performed on each common receiver gather. FIG. 4 illustrates a geometry of a portion of two downward continued common receiver gathers. The subterranean formation includes two portions 428 and 430. The synthetic seismic data was from seismic sources 408 at the surface and used when performing the downward continuation 412. Two of the geometries in the first downward continued common receiver gather are illustrated as dashed lines extending from the first simulated seismic source 416 to two reflection points 418 and 420 (where reflection point 418 is at a shallower depth than reflection point 420) and up to the first receiver 422. A single geometry in the second downward continued common receiver gather is illustrated as a solid line extending from the second simulated seismic source 424 to the reflection point 420 and up to the second receiver 426. Because the second simulated seismic source 424 and the second receiver 426, which are at the same depth, are at or below the shallower reflection point 418, there is no data corresponding to the shallower reflection point 418.

Figure 6A:
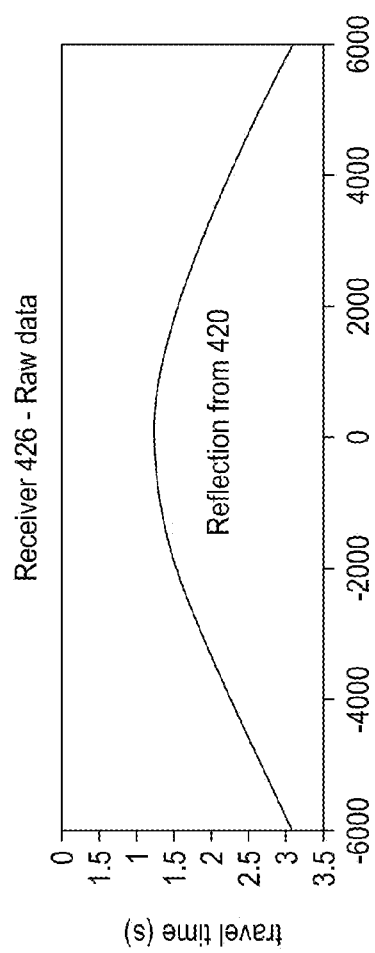
FIG. 6A illustrates the raw seismic data for the second common receiver gather of FIG. 4.
Figure 6B:
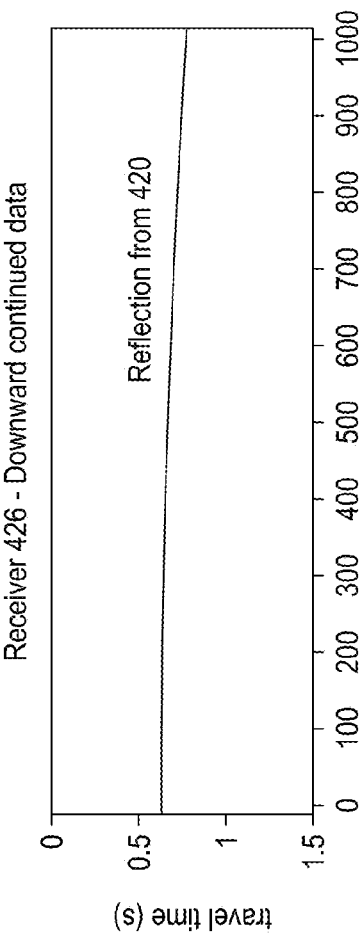
FIG. 6B illustrates the downward continued data from FIG. 5A.

With continued reference to FIG. 4, FIGS. 5A and 6A illustrate the raw seismic data from the first receiver gather and the second receiver gather, respectively. FIGS. 5B and 6B illustrate the data for the first downward continued receiver gather and the second downward continued receiver gather, respectively.

Figure 7:
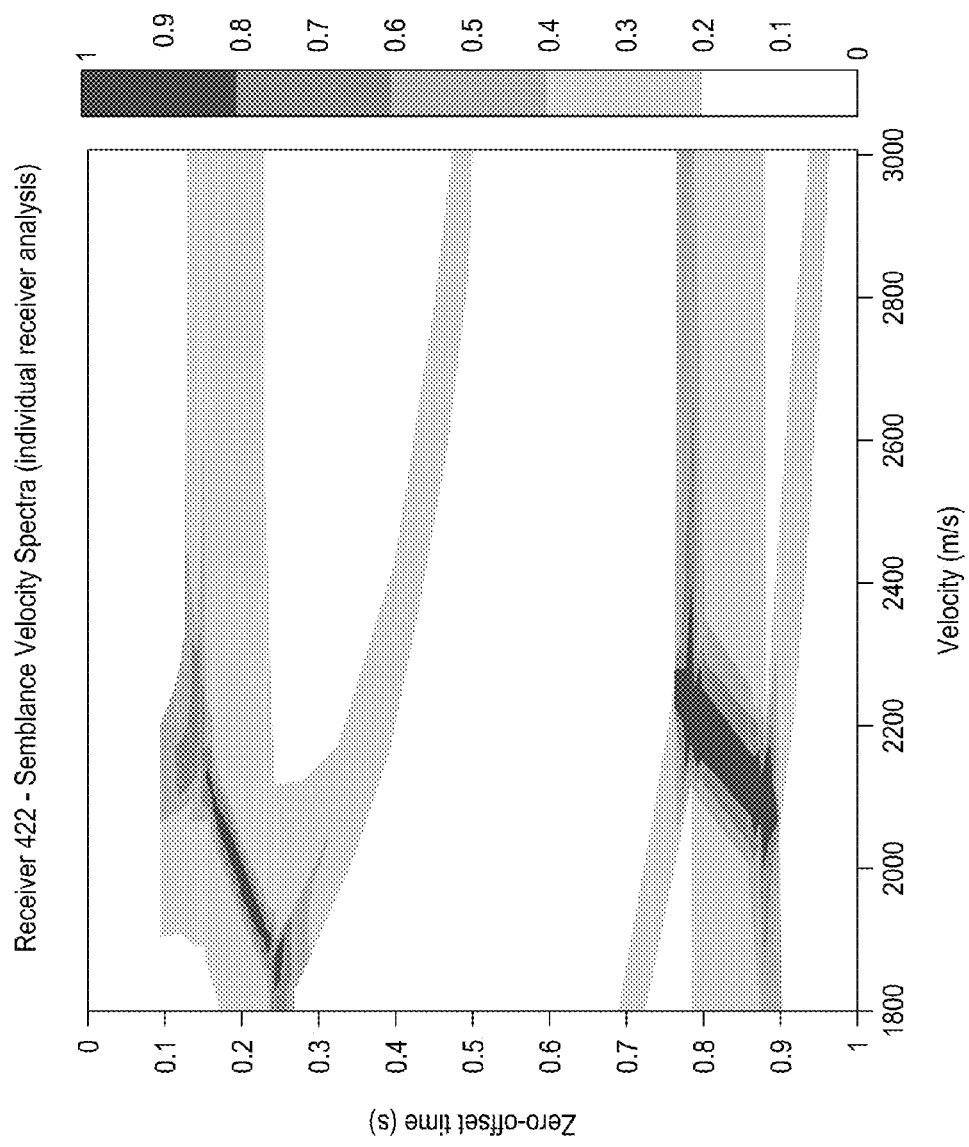
FIG. 7 illustrates a semblance velocity spectrum corresponding to the first common receiver gather of FIG. 4.
Figure 8:
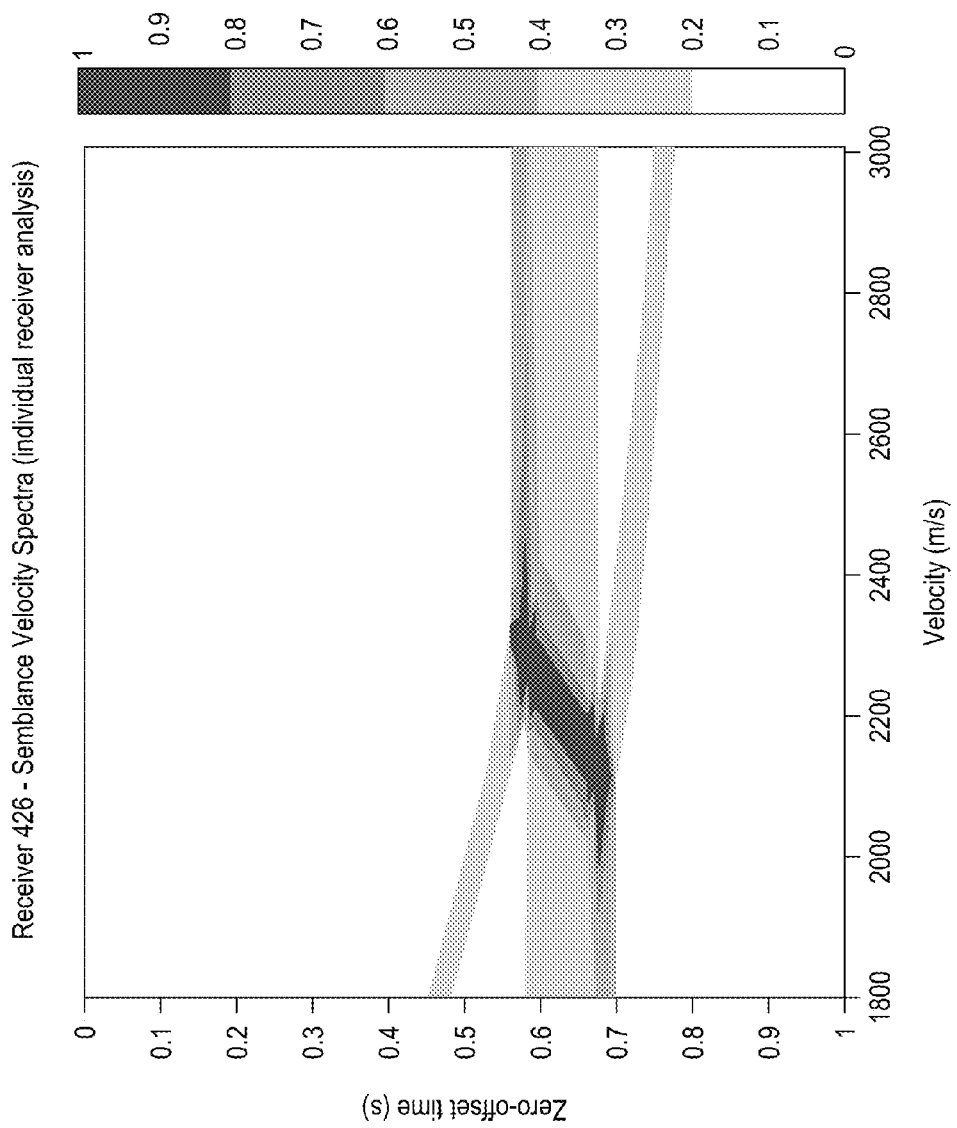
FIG. 8 illustrates a semblance velocity spectrum corresponding to the second common receiver gather of FIG. 4.

NMO analysis was then applied to each of the downward continued common receiver gathers to yield a plurality of semblance velocity spectra for individual receivers. FIG. 7 illustrates a semblance velocity spectrum for first receiver 422, which has two peaks corresponding to the reflection points 418 and 420 of FIG. 4. FIG. 8 illustrates a semblance velocity spectrum for second receiver 426, which has one peak corresponding to the reflection point 420 of FIG. 4.

Figure 9:
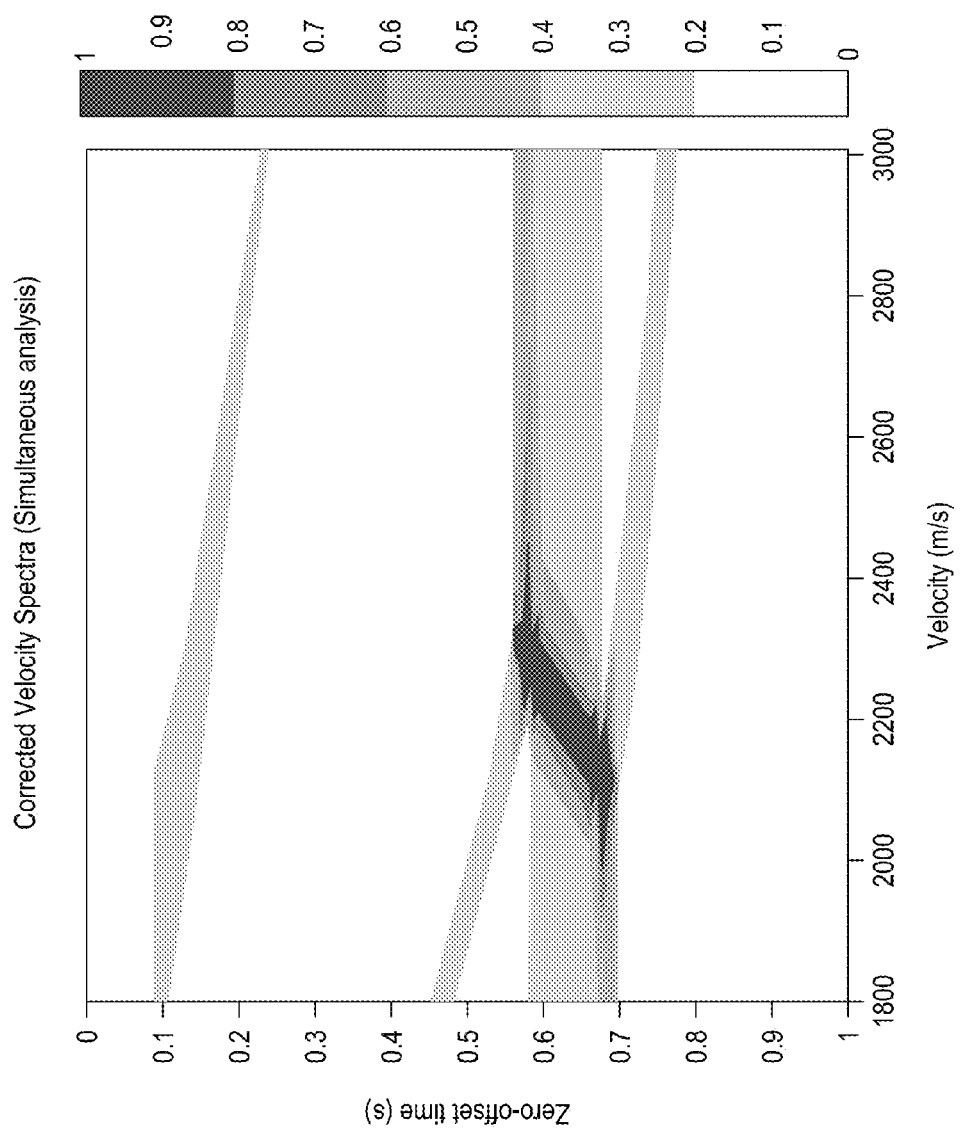
FIG. 9 illustrates a velocity spectrum derived via the simultaneous method described herein for all common receiver gathers of the Example 1.

By the simultaneous method described herein, NMO analysis, stacking, and $V_{RMS}$ correction was applied to all of the downward continued common receiver gathers to yield the corrected velocity spectrum illustrated in FIG. 9 that corresponds to a portion of the subterranean formation proximal to the second reflection point 420 of FIG. 4. Analysis by this method corresponding to the first reflection point 418 is not shown.

This example illustrates that the methods described herein that use downward continuation to simulate the seismic source being at the depth of the borehole receivers can be used with conventional surface seismic velocity analysis methods for geophysical prospecting (e.g., to identify zones of interest in a subterranean formation).

One or more illustrative embodiments incorporating the invention disclosed herein are presented herein. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    collecting seismic data for a subterranean formation from seismic sources with borehole receivers at different depths, the borehole receivers further being at different depths than the seismic sources;
    grouping the seismic data collected by each respective borehole receiver into a respective common receiver gather corresponding to each respective borehole receiver;
    performing a downward continuation on each respective common receiver gather to simulate the seismic sources being at the depth of the corresponding respective borehole receiver to produce corresponding respective downward continued common receiver gathers;
    performing a normal moveout analysis on each respective downward continued common receiver gather to produce corresponding semblance velocity spectra;
    aligning the semblance velocity spectra based at least in part on the depth of one of the borehole receivers; and
    analyzing the aligned semblance velocity spectra for a zone of interest in the subterranean formation.

2. The method of claim 1, wherein the downward continuation is a finite difference modeling code with back propagation.

3. The method of claim 1, wherein the downward continuation is a Berryhill style of downward continuation by a wave equation extrapolation.

4. The method of claim 1, wherein the downward continuation is a Huygen's style downward continuation by a Kirchhoff-like extrapolation.

5. The method of claim 1, wherein analyzing the aligned semblance velocity spectra involves (1) identifying one or more velocities of interest, (2) converting the identified one or more velocities to a series of interval velocities as a function of time, and (3) converting the series of interval velocities as a function of time to a series of interval velocities as a function of depth.

6. The method of claim 5, wherein converting the identified one or more velocities utilizes the Dix Equation.

7. The method of claim 1 further comprising drilling into and producing a fluid from the zone of interest.

8. The method of claim 1 further comprising drilling into the subterranean formation while avoiding the zone of interest.

9. The method of claim 1, wherein the one of the borehole receivers is located at a greatest depth relative to the borehole receivers.

10. The method of claim 1, further comprising:
    stacking the aligned semblance velocity spectra to produce a stacked semblance velocity spectrum, wherein the stacked semblance velocity spectrum is analyzed for the zone of interest in the subterranean formation.

11. A device comprising:
    a processor configured to:
        receive seismic data for a subterranean formation collected from seismic sources by borehole receivers at different depths;
        group the seismic data collected by each respective borehole receiver into a respective common receiver gather corresponding to each respective borehole receiver;
        perform a downward continuation on each respective common receiver gather to simulate the seismic sources being at the depth of the corresponding respective borehole receiver to produce corresponding respective downward continued common receiver gathers;
        produce semblance velocity spectra from the downward continued common receiver gathers;
        align each of the semblance velocity spectra based at least in part on the depth of a same one of the borehole receivers; and
        store the aligned semblance velocity spectra in a memory.

12. The device of claim 11, wherein the processor is further configured to:
    analyze the aligned semblance velocity spectra for a zone of interest in the subterranean formation.

13. The device of claim 11, wherein the processor is configured to:
    produce the semblance velocity spectra from the downward continued common receiver gathers by performing a normal moveout analysis on each respective downward continued common receiver gather.

14. The device of claim 11, wherein the downward continuation comprises at least one of: a finite difference modeling code with back propagation, a Berryhill style of downward continuation by a wave equation extrapolation, or a Huygen's style downward continuation by a Kirchhoff-like extrapolation.

15. The device of claim 11, wherein the processor is further configured to:
    identify one or more velocities of interest from the aligned semblance velocity spectra;
    convert the identified one or more velocities to a series of interval velocities as a function of time utilizing the Dix Equation; and
    convert the series of interval velocities as a function of time to a series of interval velocities as a function of depth.

16. The device of claim 11, wherein the same one of the borehole receivers is located at a greatest depth relative to the borehole receivers.

17. The device of claim 11, wherein the processor is further configured to:
- stack the aligned semblance velocity spectra to produce a stacked semblance velocity spectrum; and
- analyze the stacked semblance velocity spectrum for a zone of interest in the subterranean formation.

18. A computer program product comprising code stored in a non-transitory computer-readable storage medium, the code comprising:
- code to receive seismic data for a subterranean formation collected from seismic sources by borehole receivers at different depths;
- code to group the seismic data collected by each respective borehole receiver into a respective common receiver gather corresponding to each respective borehole receiver;
- code to perform a downward continuation on each respective common receiver gather to simulate the seismic sources being at the depth of the corresponding respective borehole receiver to produce corresponding respective downward continued common receiver gathers;
- code to produce semblance velocity spectra from the downward continued common receiver gathers; and
- code to analyze the semblance velocity spectra for a zone of interest in the subterranean formation.

19. The computer program product of claim 18, wherein code to analyze the semblance velocity spectra for the zone of interest in the subterranean formation comprises:
- code to align the semblance velocity spectra based at least in part on the depth of one of the borehole receivers having a greatest depth relative to the borehole receivers;
- code to stack the aligned semblance velocity spectra to produce a stacked semblance velocity spectra; and
- code to analyze the stacked semblance velocity spectra for the zone of interest in the subterranean formation.

20. The computer program product of claim 18, wherein code to analyze the semblance velocity spectra for the zone of interest in the subterranean formation comprises:
- code to stack the semblance velocity spectra to produce a stacked semblance velocity spectra;
- code to align the stacked semblance velocity spectra to produce an aligned stacked semblance velocity spectra; and
- code to analyze the aligned stacked semblance velocity spectra for the zone of interest in the subterranean formation.

* * * * *